UNITED STATES PATENT OFFICE.

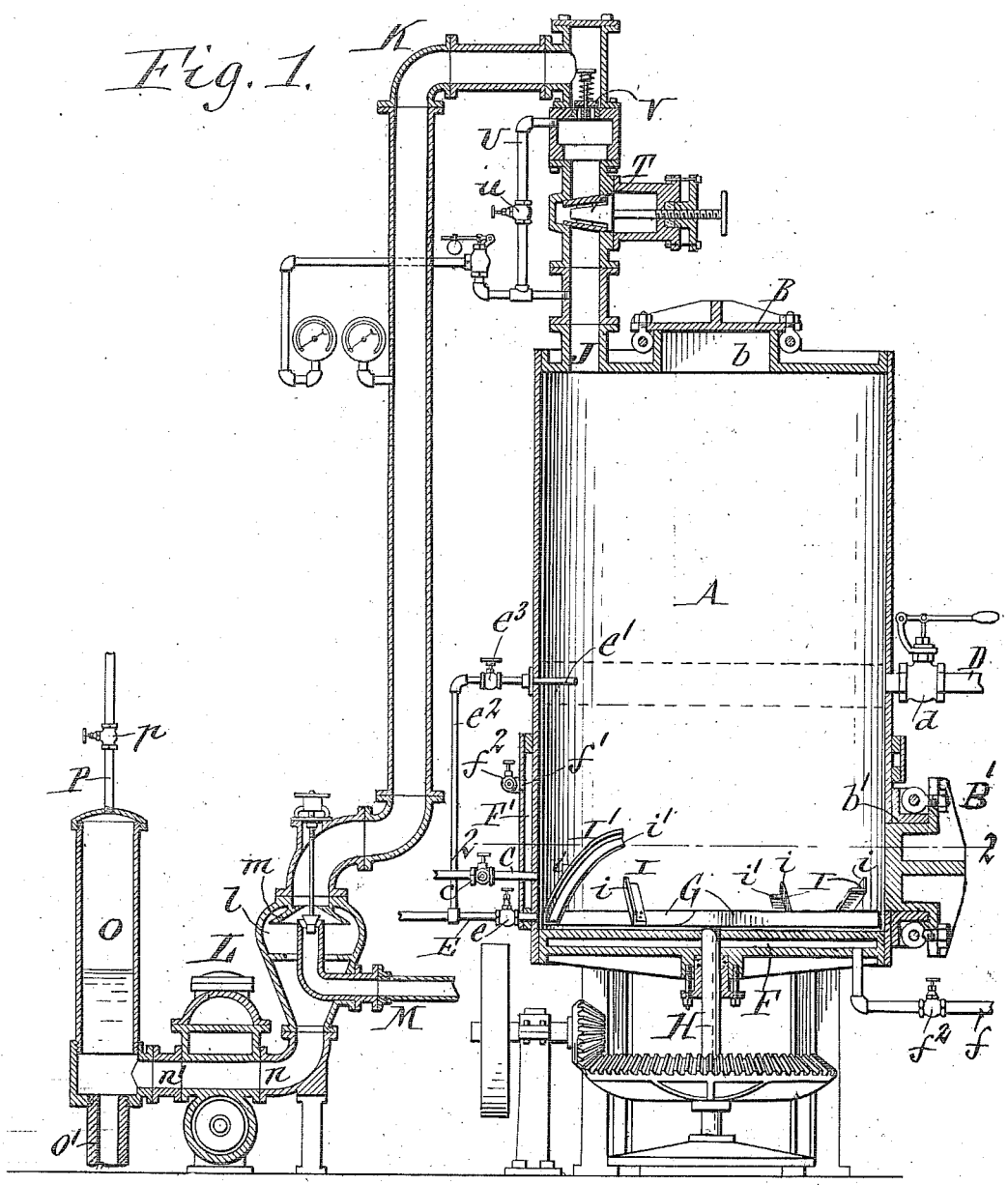

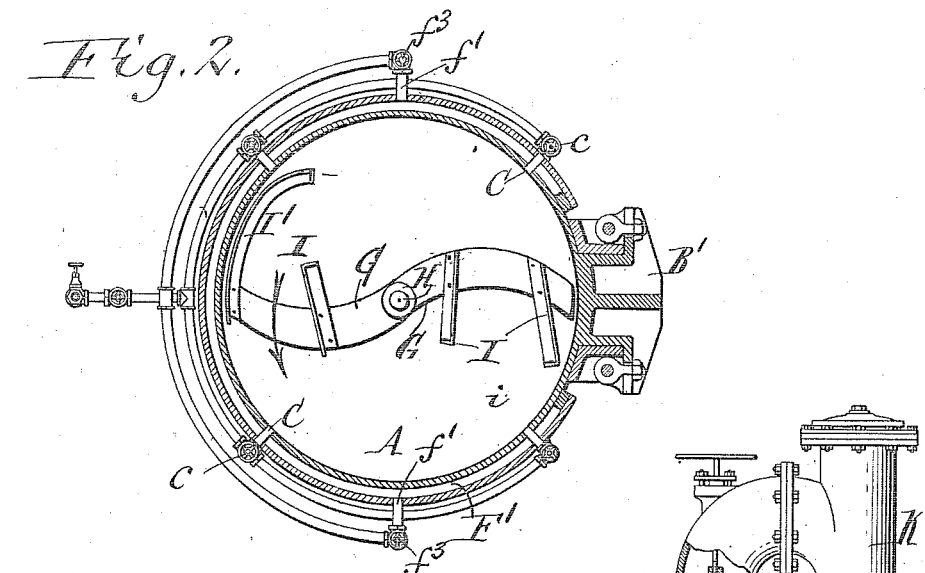
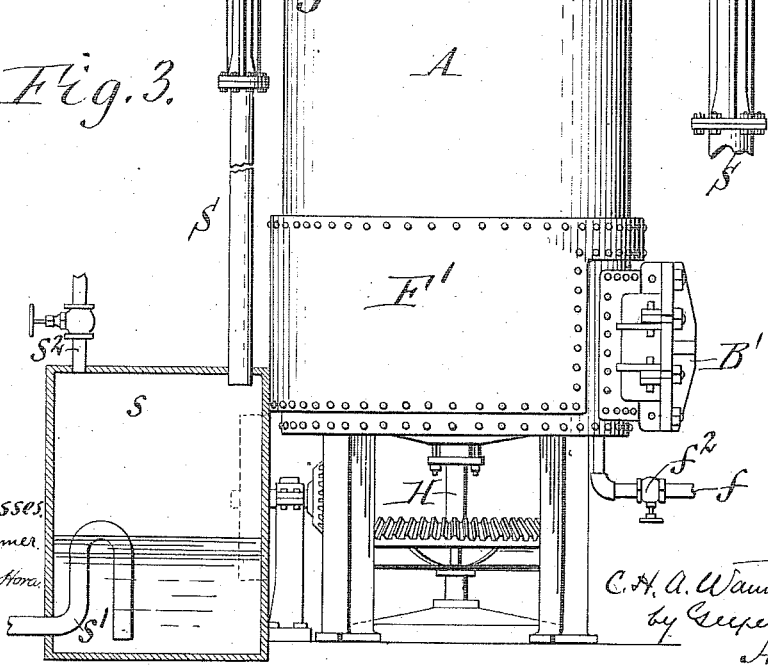

CHARLES H. A. WANNENWETSCH, OF BUFFALO, NEW YORK, ASSIGNOR OF ONE-HALF TO ALBERT C. LEMBKE, OF BUFFALO, NEW YORK.

RENDERING APPARATUS.

973,324.  Specification of Letters Patent.  Patented Oct. 18, 1910.

Application filed March 4, 1907. Serial No. 360,325.

*To all whom it may concern:*

Be it known that I, CHARLES H. A. WANNENWETSCH, a citizen of the United States residing at Buffalo, in the county of Erie and State of New York, have invented a new and useful Improvement in Rendering Apparatus, of which the following is a specification.

This invention relates to an apparatus for rendering animal matter and has the object to produce an apparatus for this purpose which enables the rendering process to be conducted sanitarily and oderlessly and extract therefrom the maximum amount of gas or vapor utilizable as fuel, and separating therefrom all the commercially valuable fat, grease and also converting the residue into a condition best suitable for fertilizer. An apparatus of this character is shown and described in Letters Patent of the United States No. 735,987 granted to F. Kleinschmidt and myself August 11, 1903.

In the accompanying drawings consisting of 2 sheets: Figure 1 is a vertical section of one form of rendering apparatus embodying my improvements. Fig. 2 is a horizontal section thereof in line 2—2, Fig. 1. Fig. 3 is a sectional elevation showing a modification of a rendering apparatus constructed in accordance with my invention. Fig. 4 is an enlarged fragmentary vertical section of the condenser and vacuum producer shown in the last mentioned construction.

Similar letters of reference indicate corresponding parts throughout the several views.

The tank A which receives the material to be treated is arranged upright and provided in its top with an inlet opening $b$ for the introduction of the material to be treated and in its side near its lower end with an outlet opening $b^1$ for the removal of the dried residue, said openings being closed by covers or doors B, $B^1$ while the apparatus is in operation. After a batch of material is placed in the tank the same is thoroughly heated and cooked by means of steam which is conducted into the tank through pipes C containing valves $c$.

After the material has been thoroughly cooked the fat or grease separated therefrom floats at the top of the mass. This fat or grease is withdrawn through a pipe D arranged about midway of the height of the tank and containing a valve $d$. The fat or grease is raised to the draw-off pipe D by means of water conducted into the lower part of the tank by a pipe E containing a valve $e$, the supply of water being so regulated as to keep pace with the discharge of fat, thereby enabling all the fat or grease to be removed through the one discharge pipe.

It has been found in practice that the grease sometimes does not flow readily from the top of the liquid laterally toward the draw off valve $d$ particularly when the grease contains large solid pieces. To overcome this difficulty a nozzle $e^1$ is arranged in the tank diametrically opposite the pipe D and below the normal liquid level in the tank and connected with the supply pipe E by a pipe $e^2$ containing a valve $e^3$ or with some other liquid or steam supply. Upon drawing off the grease the valve $e^3$ is opened so that a jet of water or other agent is directed into the body of grease toward said discharge pipe D whereby a transverse flow or current of grease toward the draw-off pipe is produced and its discharge through the latter is facilitated.

Before the fat or grease is removed, the steam supply to the interior of the tank is cut off and after the grease is removed the contents of the tank are dried by applying heat to the exterior of the tank. This is preferably effected by a lower steam jacket F arranged underneath the tank and a side steam jacket $F^1$ surrounding the lower part of the tank, steam being supplied to these jackets by pipes $f$, $f^1$ containing valves $f^2$, $f^3$. By extending the side steam jacket only around the lower part of the tank the steam is concentrated upon the charge which occupies this part of the tank, thereby economizing in the use of steam. After the residue in the tank is thoroughly dry, the steam is turned off from the jackets and when sufficiently cool the same is removed from the tank through its discharge opening $b^1$.

Within the lower part of the tank is arranged the agitator which disintegrates the material during the cooking operation for exposing all parts to the action of the heat and effectually separating the fat matters contained in the tissues of the material under treatment, which stirs up the material so as to facilitate the drying of the solid residue after the same has been cooked and the fat or grease has been drawn off and which discharges the material after being dried through the outlet opening normally closed by the door $B^1$. This agitator consists of a pair of horizontal rotatable arms G arranged diametrically on the upper end of a vertical shaft H and a plurality of teeth I, $I^1$ projecting upwardly from said arms. Each of the teeth is made of angular form preferably from short sections of angle iron which are secured to the upper sides of said arms so that the upper flange $i$ of each tooth is arranged vertically and the lower flange $i^1$ projects horizontally inward from the lower edge of the vertical flange, as shown in Fig. 1. The teeth are also so arranged that they travel in different circular paths and some trend outwardly while others trend inwardly relatively to the axis of rotation, thereby bringing all parts of the material under the action of the agitator and thoroughly breaking up the same and liberating the fat therein.

The outermost tooth $I^1$ of one of the arms G is arranged close to the inner side or bore of the upright wall of the tank and its rear end is curved or bent inwardly, thereby causing the material lying against the wall of the tank to be constantly moved inwardly by the tooth $I^1$ and thus permit the heat to penetrate and reach all parts of the same. The several teeth are attached at their front ends to the arms G while their rear ends trail behind the arms, as shown in Figs. 1 and 2, thereby obtaining a large stirring area without making the arms unduly wide and heavy. Each of the agitator arms is curved so that its front or advancing side is convex and its rear or trailing side is concave. The two arms together are S-shaped, as shown in Fig. 2, and operate more effectually as conveyers for discharging the material after it is dried from the tank through the outlet opening at the bottom.

While the material in the tank is being cooked and dried, vapors or gases are given off from the same. These vapors are drawn off through a vapor outlet J arranged at the top of the tank and connecting with the front end of a main vapor or gas conduit or discharge pipe K. This vapor conduit is connected with a device which operates to produce a vacuum in the tank so as to forcibly withdraw the vapors or gases therefrom, thereby facilitating the cooking and drying process, and it also operates to condense certain vapors or gases so that they can be discharged into a sewer and carried away. Various forms of condensers and vacuum producers may be used for this purpose.

The condenser and vacuum producer L shown in Fig. 1 is constructed in the form of a pump, $l$ being the condensing chamber which connects with the rear end of the main vapor conduit K, M the water inlet pipe entering the condensing chamber, $m$ the conical spreader arranged in the condensing chamber over the outlet of the water pipe, and $n$ the suction pipe of the pump connected with the condensing chamber. The water from the pipe M, the condensed vapors and the uncondensed vapors are delivered by the discharge pipe $n^1$ of the pump into a collecting chamber O. The latter has its lower part connected with a liquid drain or discharge pipe $o^1$ while its upper part is connected with a gas or vapor discharge pipe P containing a valve. The vapors which have been condensed by the pump L pass with the condensing water from the collecting chamber through the liquid discharge pipe $o^1$ while the uncondensed vapors which are very light and combustible separate from the liquid in the collecting chamber and rise into the upper part of the collecting chamber and are conducted by the pipe P to a furnace or other place where they may be burned or consumed. The liquid outlet of the collecting chamber is preferably somewhat smaller than the discharge pipe of the pump, thereby retarding the escape of the liquid from this chamber and enabling the free or uncondensed vapor or gas contained in the liquid to bubble upwardly through the latter into the upper part of the chamber and be discharged therefrom under pressure, thereby preventing these gases from reaching the sewer. By this means of disposing of the condensable and non-condensable gases, the aparatus is rendered absolutely odorless and sanitary, enabling the same to be installed in localities where its use otherwise would be prohibited.

In Figs. 3 and 4, the vacuum and condensation is produced by a barometric condenser consisting of an elevated condensing chamber Q having its upper inlet connected with the tail or rear end of the vapor pipe, a water supply pipe $q$ connected with the side of the condensing chamber, a discharge throat $r$ arranged at the lower outlet of the condensing chamber, and a nozzle $r^1$ extending from said vapor pipe K into the throat. The outlet of the condensing chamber is connected by an upright tail pipe S which opens at its lower end into a collecting chamber $s$. The latter is provided in its lower part with a liquid delivery pipe $s^1$ and in its upper part with a gas delivery pipe $s^2$. As the water supplied from any suitable source enters the condensing chamber through the pipe $q$ and passes between the nozzle and throat downwardly in the tail pipe, the vapors or gases are withdrawn from the tank and subjected to a condensing operation. The liquid entering the condensing chamber is conducted to the sewer by the pipe $s^1$ and the uncondensed gases which separate from the liquid and gather in the upper part of this chamber are carried away by the pipe $s^2$ and consumed.

While cooking of the material in the tank is taking place, the gas or vapor outlet is restricted and opened only enough to allow the gases and vapors liberated from the material to escape and the condensing device is operated to produce a sufficiently low vacuum to just carry away these gases. During the cooking operation the gases or vapors which are given off from the material under treatment are most of a non-condensable highly explosible and odoriferous character, but during the operation of drying the residue the vapors or gases which are driven off from the material are mostly of a condensable character. The vapor or gas outlet of the tank at this time is therefore opened fully and the condensing device is operated to produce a high vacuum or exhausting effect proportionately to the increase in yield of vapor.

It has been found impracticable to employ a single valve for controlling the gas outlet under these different conditions inasmuch as a valve constructed to permit of opening the gas outlet fully at high vacuum does not permit of closely adjusting this outlet nicely at low vacuum to produce the best results. In order to meet these differing conditions, a large main valve T preferably of the gate type is arranged in the main gas conduit which permits of fully opening the same during the drying operation. A reduced or restricted by-pass or pipe U is also provided which is connected at opposite ends with the main gas conduit in front and in rear of the main valve and contains a small auxiliary valve $u$. During the cooking operation the main valve T is closed and the auxiliary valve $u$ is opened just enough to permit escape of the gases which are generated at this time.

In order to prevent any accidental back pressure or movement through the main gas conduit and by-pass a check valve V is arranged in the main gas conduit in rear of the main valve T and the rear end of the by-pass, as shown in Figs. 1, 3 and 4, thereby preventing accidental passage of water from the condenser to the tank and interfering with the drying of the residue.

I claim as my invention:

1. A rendering apparatus comprising a tank provided at its top with an inlet for the material to be treated and an outlet for the vapor, on its bottom with an outlet for the solid residue, and at its side with an outlet for the grease, a stirrer arranged in the lower part of the tank, and a steam inlet nozzle arranged in the tank horizontally opposite the grease outlet.

2. A rendering apparatus comprising a tank, an agitator arranged in the lower part of the tank, a main vapor delivery pipe connected with the top of the tank, an exhausting device connected with the outlet of the main vapor pipe, a main valve arranged in the main vapor pipe, a check valve arranged in the main vapor pipe in rear of the main valve and adapted to close toward the tank and open away from the tank, a by-pass pipe connected at its front end with the main pipe in front of the main valve while its rear end is connected with the main pipe on that side of the check valve opposite to the main valve, and an auxiliary valve arranged in said by-pass pipe, substantially as set forth.

Witness my hand this 28th day of February, 1907.

CHARLES H. A. WANNENWETSCH.

Witnesses:
THEO. L. POPP,
E. M. GRAHAM.